Aug. 1, 1967 A. M. CHREITZBERG ET AL 3,333,986
BATTERY UTILIZING BIBULOUS MATERIAL WICK
MEANS TO FEED ELECTROLYTE BY
CAPILLARY ACTION
Filed June 26, 1964

United States Patent Office 3,333,986
Patented Aug. 1, 1967

3,333,986
BATTERY UTILIZING BIBULOUS MATERIAL WICK MEANS TO FEED ELECTROLYTE BY CAPILLARY ACTION
Augustus M. Chreitzberg and George S. Hartman, Raleigh, and Gayle M. Wylie, Cary, N.C., assignors to The Electric Storage Battery Company, a corporation of New Jersey
Filed June 26, 1964, Ser. No. 378,111
7 Claims. (Cl. 136—6)

The invention described herein was made in the performance under a National Aeronautics and Space Administration contract and is subject to the provisions of Section 305 of the National Aeronautics and Space Administration Act of 1958, Public Law 85–568 (72 Stat. 435; 42 U.S.C. 2457).

The present invention generally relates to electrode and separator assemblies for electric batteries. More specifically, the present invention is concerned with a separator system for alkaline batteries of the type utilizing one or more layers of a semi-permeable membrane material as all or part of the separation system insulating electrodes of one polarity from electrodes of the opposite polarity.

In certain types of alkaline batteries, particularly those having positive electrodes of silver, one or more layers of semi-permeable membrane material, such as cellophane, are utilized in the electrode separation system to prevent migration of particles of electrode material from the electrodes of one polarity to the electrodes of the opposite polarity. While the pore structure of a semi-permeable membrane material such as cellophane is operative to inhibit particle migration between electrodes, it is also such as to impede the circulation of electrolyte between eletcrodes. The effect of semi-permeable membranes upon electrolyte circulation is manifested during charge by a withdrawal of electrolyte from the area of positive electrode by osmosis through the membrane. Under certain conditions of discharge the same mechanism can cause a withdrawal of electrolyte from the area of the negative electrodes. This effect can be particularly severe in batteries having a limited amount of free electrolyte and can adversely affect battery performance.

By way of example, in a silver-zinc battery the positive silver electrodes are usually enclosed in a plurality of layers of a semi-permeable membrane material such as cellophane, while the negative electrodes are directly exposed to the electrolyte, which is an aqueous solution of potassium hydroxide. The charge and discharge reactions at the positive electrode can be stated as follows:

(a)  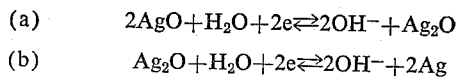

(b)  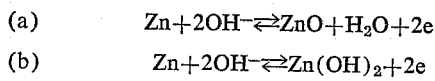

One or more of the following reactions takes place at the negative electrode:

(a)  $Zn + 2OH^- \rightleftarrows ZnO + H_2O + 2e$ (b)  $Zn + 2OH^- \rightleftarrows Zn(OH)_2 + 2e$ As is evidenced by the above equations, OH ions are consumed and water molecules are produced at the positive electrode during charge. At the negative electrode OH ions are produced and water molecules may or may not be consumed. The result of the above reactions is the establishment of an electrolyte concentration gradient across the membrane that is low at the positive electrode and high at the negative electrode. This concentration gradient causes water molecules to be transferred from the positive electrodes to the negative electrodes due to osmotic pressure. As a result of the initial concentration gradient and the transfer of $H_2O$, the electrolyte level rises around the negative electrode and falls around the positive electrode during charge. It should be noted that during discharge exactly the opposite conditions exist. The loss of electrolyte at the positive electrodes can result in a substantial reduction in the electrolyte-active material interface, thereby preventing the positive electrodes from accepting a full charge. Depending upon battery geometry, these reactions may also result in a dry negative electrode during discharge and consequently poor battery performance.

While the thickness in number of layers of semi-permeable membrane material utilized in the separator system can be reduced to lessen its effect upon electrolyte circulation, to do so results in a sacrifice in the protection such material provides against particle migration. Another obvious method of reducing the effect of semi-permeable membrane material on electrolyte circulation is to provide an excess of free electrolyte beyond that which would be normally required for efficient cell operation. In some battery systems this solution to the problem can be tolerated, but it inherently lowers the energy density of the cell, and hence it is not an acceptable solution where cell weight and volume are primary considerations.

Accordingly, an object of the present invention is to provide a new and novel battery separator and electrode assembly utilizing semi-permeable membrane material with its inherent particle migration inhibiting properties, which provides for improved electrolyte distribution and hence improved battery performance.

It is another object of the present invention to provide a new and improved separator system of the type described, which provides an additional electrolyte path between electrodes of opposite polarity to overcome the effect upon electrolyte distribution of the semi-permeable membrane material.

Still another object of the present invention is to provide improved electrolyte distribution in a separator system of the type described without any substantial decrease in the energy density of the cell.

These and other objects of the present invention are accomplished by means of a novel separator system, which includes a wick structure which is operable by capillary action to transfer electrolyte between the positive and negative electrodes. The wick generally comprises a strip of bibulous material such as matter or woven fibers, which may be approximately the same width as the positive electrodes. In one configuration the wick extends in a folded arrangement, starting at the bottom of a negative electrode, and passes upward adjacent to the face of that electrode, over the semi-permeable membrane layers, downward adjacent to one side of a positive electrode, around the bottom of that electrode, upward adjacent to the opposite side of that electrode, over the semi-permeable membrane layers, and downward along the face of the next adjacent negative electrode. Such a wick structure is operative to minimize changes in electrolyte distribution and to eliminate the interent dryness surrounding the positive electrodes on charge and the negative electrodes on discharge without resorting to excessive volumes of electrolyte and without any reduction in the semi-permeable membrane system.

A better understanding of the present invention may be had from the following description when read with reference to the accompanying drawing, of which:

Figure 1:
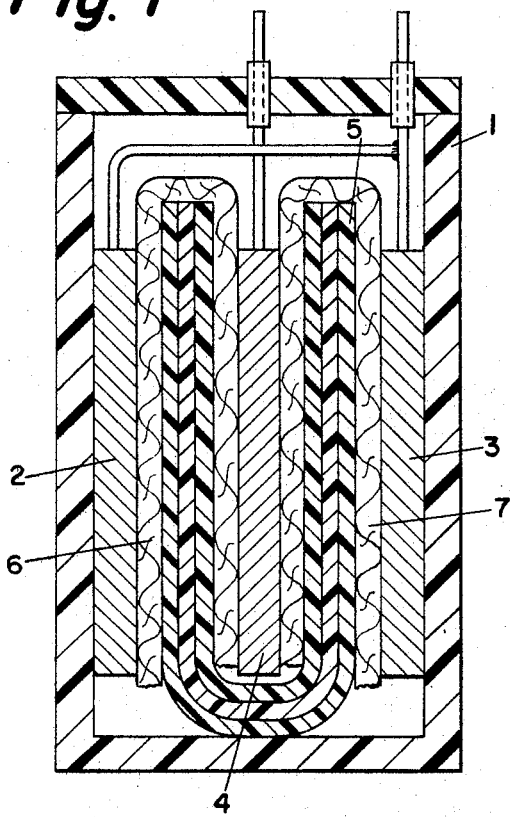
FIG. 1 is a side elevation taken in section of a battery utilizing a battery separator and electrode assembly in accordance with the present invention.

Referring now to FIG. 1, the numeral 1 designates a battery container housing a battery element comprising a pair of electrodes 2 and 3 of one polarity and an electrode 4 of the opposite polarity. The electrodes 2, 3 and 4 are separated from each other by means of a plurality of layers of a semi-permeable membrane 5 arranged in a U-shaped fold surrounding the electrode 4 to form an envelope open at the top. Although not shown, the side edges of the semi-permeable membrane may be folded over or otherwise sealed to completely envelop the electrode, except where open at the top. In accordance with the present invention, a sheet of bibulous wick material 6 extends in a folded arrangement, starting at the bottom of the electrode 2 and passing upward adjacent to the inner face of that electrode and over the top of the open end of the U-shaped envelope of semi-permeable membrane 5 and downward between the membrane 5 and one face of the electrode 4. Similarly, another sheet of bibulous wick material 7 extends in a folded arrangement, starting at the bottom of the electrode 3 and extending upward adjacent to the inner face of that electrode and over the top of the open end of the envelope formed by the semi-permeable membrane material and then downward between the membrane 5 and the face of the electrode 4. The amount of electrolyte in the battery of FIG. 1 is limited to that substantially wholly absorbed within the pores of the battery element, that is, the electrodes and separator system including the wick.

In a typical embodiment of the battery shown in FIG. 1, the electrodes 2 and 3 contain zinc active material, and the electrode 5, silver active material. In a silver-zinc battery of this type, the electrolyte is potassium hydroxide or some other conventional alkaline electrolyte, and the semi-permeable membrane material 5 is a plurality of sheets of regenerated cellulose or cellophane. The electrode 4 may be the negative zinc electrode, and the electrodes 2 and 3, silver electrodes. It should also be understood, however, that the battery of FIG. 1 may be a silver-cadmium battery. In this system, the positive electrodes are silver and the negative electrodes cadmium.

As explained hereinbefore, in batteries having a semi-permeable membrane as all or part of the separator system, there are developed electrolyte concentration gradients across the layers of semi-permeable separator material which in turn, through the mechanism of osmosis, cause a transfer of electrolyte through the membrane toward the region of lower electrolyte concentration. The effect of this transfer can be so pronounced that the electrodes of one polarity will be substantially dry, making large areas of these electrodes unavailable for electrochemical reaction. The wick of the present invention provides a path by which electrolyte can be transferred by capillary action through the wick from one side of the semi-permeable membrane layers to the other to provide for irrigation of electrodes with electrolyte. In this manner, the effect of osmotic transfer of electrolyte due to concentration gradients across the membrane layers is substantially reduced, thereby improving the battery performance.

With the present invention, improved electrolyte distribution is maintained by means of the wick without the reduction in the protection provided by the multi-layers of semi-permeable membrane isolating electrodes of one polarity from the electrodes of the opposite polarity. In this respect, it should be noted that cellophane is utilized as part or all of the separation system of a silver-zinc battery primarily to prevent the migration of silver from the positive electrode to the negative zinc electrode. Since a conductive bridge may be formed through the cellophane as a result of oxidation of the cellophane by silver oxide, multi-layers of this material must be used. Migration of silver particles through the wick has not been found to be detrimental to battery performance because preferred wick materials do not react with silver to form a conductive silver compound, and the wick path is substantially longer than the direct path through the multi-layers of cellophane.

A number of materials which are capable of absorbing electrolyte by capillary action have been found to be suitable for use as the wick. Particularly effective are the felted, nonwoven fibrous sheet materials of electrolyte-resistant polymers such as nylon, polyurethane, polypropylene, and Dynel. However, woven materials which are bibulous in nature, such as nylon or polypropylene fabrics, are also satisfactory. The wicking member is preferably the same width as the electrodes, so as to wet substantially the entire face of the electrodes. The thickness of the wicking member will vary in accordance with the electrolyte requirements of the cell, cell impedance requirements, and other related factors. However, thicknesses on the order of between 0.003 and 0.006 inch for the materials specified above have been found to be satisfactory.

Figure 2:
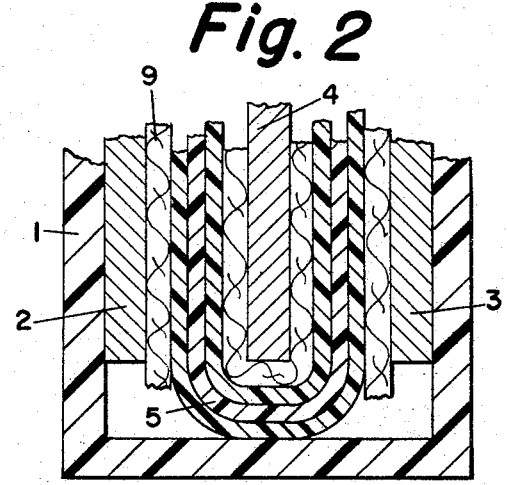
FIG. 2 is a side elevation taken in partial section of a battery of the type shown in FIG. 1 incorporating a modification of the separator and electrode assembly of the present invention.

In the modification of the present invention shown in FIG. 1, two strips of bibulous wick material were utilized, each one lying adjacent an opposite face of the electrode 4. Referring now to FIG. 2, similar reference characters have been used to indicate components similar to those in FIG. 1. In this embodiment of the invention, a single sheet of bibulous wick material 9 has been utilized. As shown, the wick 9 extends in a folded arrangement, starting at the bottom of the electrode 2, and passing upward adjacent to the inner face of that electrode, over the top of the U-shaped envelope of semi-permeable membrane material 5, as shown in FIG. 1, and downward between the membrane 5 and one face of the electrode 4, then around the bottom of the electrode 4 and upward between the membrane 5 and the opposite face of the electrode 4, and then over the top of the envelope of membrane material, as shown in FIG. 1, then downward between the membrane 5 and the inner face of the electrode 3. With this construction, the bibulous wick material can be wrapped around the electrode 4 prior to insertions into the envelope of semi-permeable membrane material 5.

Figure 3:
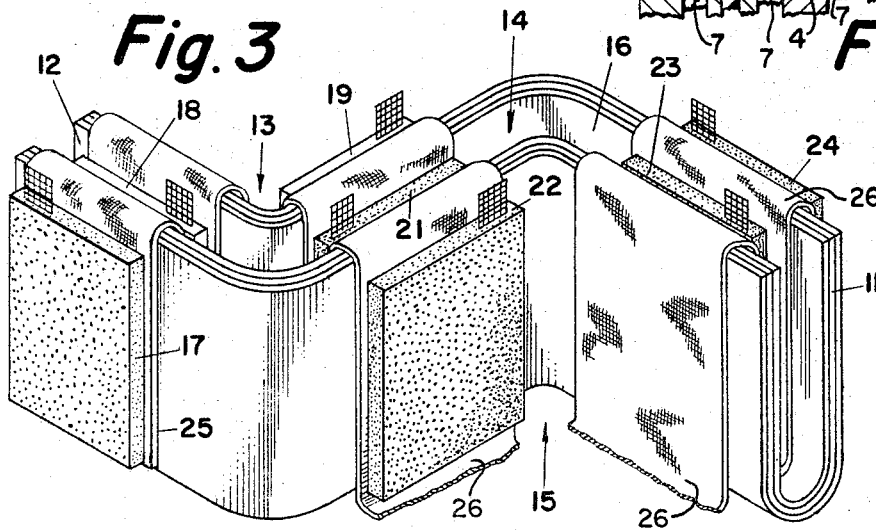
FIG. 3 is a perspective view of an accordion-folded separator and electrode assembly (partly completed), embodying the construction of the present invention.

The teachings of the present invention are applicable to other electrode-separator assemblies. For example, it may be applied to a more complicated separator system such as is illustarted in FIG. 3. In this figure, there is shown a so-called accordion-folded electrode assembly utilizing a plurality of sheets of semi-permeable membrane material 11 which are folded along a horizontal line and folded in a zig-zag fashion to form a plurality of electrode compartments 12, 13, 14, 15 and 16. In this assembly, the compartment 12 houses an electrode 18; the compartment 13, an electrode 19; the compartment 14, an electrode 21; the compartment 15, an electrode 22; and the compartment 16, an electrode 23. In additon to the electrodes 18 through 23, a pair of additional electrodes 17 and 24 are located outside of the accordion assembly, one adjacent to each end thereof. The electrodes 17, 19, 22, and 24 are of one polarity, and the electrodes 18, 21, and 23 are of the opposite polarity. As shown, a strip of bibulous wick material 25 starts at the bottom of the electrode 17 and extends upward along the inner face of that electrode, then over the top of the semi-permeable membrane material 11, downward into the electrode compartment 12, around the electrode 18, and upward along the opposite side of the electrode 18, over the top of the layers of membrane 11, and downward into the electrode compartment 13, and around the electrode 19. In a similar manner, the wick 26 passes continuously into each of the electrode compartments 14, 15 and 16, and around the electrodes therein, and then over the top of the semi-permeable membrane material 11, and then downward between the inner face of the electrode 24 and the end of the accordion-fold of the membrane material 11. In this manner, it provides an electrolyte migration path around the semi-permeable membrane layers 11 which substantially eliminates the effects of the transfer of electrolyte through the membrane by osmosis.

Figure 4:
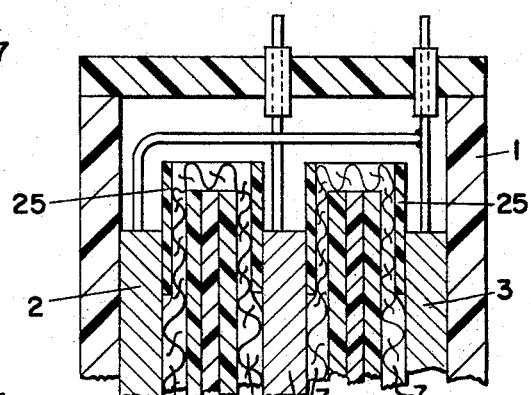
FIG. 4 is a side elevation taken in partial section of a battery illustrating a modification of the embodiment of the present invention shown in FIG. 1.

Referring now to FIG. 4, there is shown a modification of the embodiment of the present invention illustrated in FIG. 1. This modification is particularly adapted for use in batteries having zinc negative electrodes and is designed to prevent zinc trees in the wick material. Similar reference characters have been utilized to designate components similar to those shown in FIG. 1. To protect the wick 7 from the formation of zinc trees, a shield 25 comprising a layer of semi-permeable membrane material such as cellophane is wrapped around the top of the wick 7 where it extends above the tops of the electrodes 2, 3 and 4. The shield 25 thus encloses the top of the wick and isolates it from adjacent elements of the cell. While the shield 25 has been illustrated as comprising a single layer of membrane material, it should be understood that additional layers may be utilized. The shield 25 extends downward between the wick 7 and the faces of the adjacent electrode surfaces a sufficient distance to be held in place by the normal compression between these elements. It should be noted, however, that the shield 25 extends downward no farther than is necessary so that it does not interfere with the operation of the wick in promoting improved electrolyte distribution. As will be understood by those skilled in the art, the shield 25 is unnecessary in cells having electrodes of an insoluble material such as cadmium.

From the foregoing, it can be seen that, by means of the present invention, it is possible to maintain all of the electrodes of the battery system in contact with sufficient electrolyte to permit normal battery operation despite a transfer of electrolyte through a semi-permeable membrane as a result of electrolyte concentration gradients across the membrane. It should be noticed that improved electrolyte distribution is maintained without a reduction in the protection afforded by the use of a semi-permeable membrane system between electrodes and thereby provides the protection against electrode particle migration which such membranes provide. In this respect, it should also be noticed that the wick structure of the present invention does not substantially decrease the energy density of a cell, inasmuch as it adds very little to the total volume and weight of the separator system.

Having described said invention, that which is claimed as new is:

1. An electric battery comprising a casing containing at least one electrode of one polarity, at least one electrode of the opposite polarity, separator means comprising a semi-permeable material open at one end and enclosing at least one of said electrodes, a wick of bibulous material extending along at least one face of said electrode of one polarity and folded over the open end of said separator means into contact with at least one face of said electrode of the opposite polarity to provide a path by which electrolyte can pass by capillary action from said electrode of one polarity to said electrode of the opposite polarity, and an alkaline electrolyte substantially wholly absorbed in said electrodes, said separator means and said wick.

2. An electric battery in accordance with claim 1 in which the portion of said wick of bibulous material folded over the open end of said separator means is enclosed in semi-permeable material.

3. An electric battery in accordance with claim 1 in which said electrode of one polarity is a silver positive electrode, said electrode of the opposite polarity is a zinc or cadmium negative electrode, and said separator means comprises at least a plurality of layers of cellophane.

4. An electric battery in accordance with claim 1 in which each of said electrodes of one polarity has a wick of bibulous material adjacent to each face thereof.

5. An electric battery comprising a casing containing a plurality of electrodes of one polarity and a plurality of electrodes of opposite polarity arranged alternately, separator means comprising a semi-permeable material open at one end and enclosing each of said electrodes of one polarity, a wick of bibulous material extending along at least a portion of one face of said electrodes of one polarity and folded over the bottom edge of said electrodes of one polarity and extending along the other face of said electrodes of one polarity and folded over the open end of said separator means into contact with at least one face of said electrodes of opposite polarity, said wick of bibulous material providing a path by which electrolyte can pass by capillary action from said electrodes of one polarity to said electrodes of opposite polarity, and an alkaline electrolyte substantially wholly absorbed in said electrodes, said separator means and said wick.

6. An electric battery in accordance with claim 5 in which the portion of said wick of bibulous material folded over the open end of said separator means is enclosed in semi-permeable material.

7. An electric battery in accordance with claim 5 in which said electrodes of one polarity are silver positive electrodes, and said electrodes of the opposite polarity are zinc or cadmium negative electrodes, and said separator means comprises at least a plurality of layers of cellophane.

References Cited
UNITED STATES PATENTS

| | | | |
|---|---|---|---|
| 3,174,879 | 3/1965 | Stanimirovitch | 136—6 |
| 3,207,630 | 9/1965 | Solomon et al. | 136—30 X |
| 3,216,859 | 11/1965 | Duncan | 136—6 |

WINSTON A. DOUGLAS, *Primary Examiner.*

B. OHLENDORF, A. SKAPARS, *Assistant Examiners.*